US012190725B1

(12) United States Patent
Hakki et al.

(10) Patent No.: US 12,190,725 B1
(45) Date of Patent: Jan. 7, 2025

(54) TRAFFIC CONTROL SYSTEM AND APPARATUS

(71) Applicants: A-Hamid Hakki, Dunedin, FL (US);
Edin Derviŝhalidović, Sarajevo (BA);
Naida Derviŝhalidović, Sarajevo (BA);
Nadia Hana Hakki, Dunedin, FL (US);
Mejid Balla, Seffner, FL (US)

(72) Inventors: A-Hamid Hakki, Dunedin, FL (US);
Edin Derviŝhalidović, Sarajevo (BA);
Naida Derviŝhalidović, Sarajevo (BA);
Nadia Hana Hakki, Dunedin, FL (US);
Mejid Balla, Seffner, FL (US)

( * ) Notice: Subject to any disclaimer, the term of this patent is extended or adjusted under 35 U.S.C. 154(b) by 0 days.

(21) Appl. No.: 18/772,119

(22) Filed: Jul. 13, 2024

(51) Int. Cl.
| G08G 1/096 | (2006.01) |
| G08G 1/07 | (2006.01) |
| G08G 1/095 | (2006.01) |
| F21S 8/08 | (2006.01) |
| F21V 23/02 | (2006.01) |
| F21V 29/90 | (2015.01) |
| F21Y 113/13 | (2016.01) |
| F21Y 115/10 | (2016.01) |
| G02B 27/00 | (2006.01) |

(52) U.S. Cl.
CPC .............. *G08G 1/096* (2013.01); *G08G 1/07* (2013.01); *G08G 1/095* (2013.01); *F21S 8/086* (2013.01); *F21V 23/02* (2013.01); *F21V 29/90* (2015.01); *F21Y 2113/13* (2016.08); *F21Y 2115/10* (2016.08); *G02B 27/0006* (2013.01)

(58) Field of Classification Search
CPC .......... G08G 1/095; G08G 1/096; G09F 7/20; G09F 9/30; G09F 9/33; E01F 9/40; H02S 20/20; H02S 20/32; B60Q 1/00; B60Q 1/14; B60Q 1/26
See application file for complete search history.

(56) References Cited

U.S. PATENT DOCUMENTS

| 2,736,002 | A | * | 2/1956 | Oriel | G08G 1/096 |
| | | | | | 340/930 |
| 8,563,898 | B1 | * | 10/2013 | Wright | B60Q 1/0017 |
| | | | | | 219/202 |
| 2007/0200730 | A1 | * | 8/2007 | Kang | G08G 1/095 |
| | | | | | 340/815.45 |

(Continued)

OTHER PUBLICATIONS

How the Brain Interprets Motion While in Motion, Lindsey Valich; University of Rochester; Jun. 13, 2022.

*Primary Examiner* — Van T Trieu
(74) *Attorney, Agent, or Firm* — Larson & Larson; Frank Liebenow; Justin P. Miller

(57) ABSTRACT

A traffic control system has a single light emitting area with a central location in which sensors are optionally positioned. The traffic control system is angled downward towards a roadway for improved visibility and improved aiming of the sensors. The single light emitting area selectively illuminates red, yellow, or green light to signal to the vehicle drivers when they can safely move through the intersection or when they should stop. The light emitting area presents a moving dark area or bar during display of green to convey proceed to those that are color impaired. A sweep hand as in a clock is displayed during the caution state to convey the length of time that the caution state will remain (yellow color is displayed) and also to convey the state of caution to those that are color impaired.

20 Claims, 6 Drawing Sheets

(56) References Cited

U.S. PATENT DOCUMENTS

2008/0272936 A1* 11/2008 Kim .................. G08G 1/095
340/944
2022/0380990 A1* 12/2022 Stenneth ............... E01F 9/40
2024/0113651 A1* 4/2024 Jacques ............... H01L 31/042

* cited by examiner

TRAFFIC CONTROL SYSTEM AND APPARATUS

BACKGROUND OF THE INVENTION

Traffic control signals have been in use to direct horse carriages, trains and vehicles for over 150 years. On Dec. 10, 1868, the first ever traffic control signal was installed at Parliament Square in London, United Kingdom. This traffic control signal had manual pivoting semaphore arms and two gas lamps, one red and one green. Unfortunately, the gas-lit structure exploded and killed the police officer who was controlling the traffic of carriages. On Aug. 5, 1914, the first electric traffic control signal was installed in Cleveland Ohio. Around 1920, the first electric three-colored traffic control signal was installed in New York and Michigan. On Mar. 30, 1921, the first convention to unify traffic control signals was held in Geneva, Switzerland to improve road traffic safety. Contributing to advances in traffic control signals, the visible light emitting diode (LED) was invented in 1962 by Nick Holonyak Jr. Later, super-bright LEDs were developed in the 1980s and 1990s. Michigan was the first state to incorporate red, yellow, and green LED traffic lights around 2006.

The design of traffic control signals has changed very little in the past 100 years.

Prior-art traffic control signals have several disadvantages. The prior traffic control signal design is not color blind friendly, they have a high profile, they are not aerodynamic, they use excess material and excessive LEDs, they require three visors/hoods, their bezels are at 90° from the road surface, they are difficult to visualize at sunrise and sunset, they have reduced functionality with environmental factors such as snow, ice, extreme cold weather, sand and dust, additional external fixtures are required for sensors such as laser, radar, cameras or Doppler, and existing traffic control signals generally require geomagnetic ground sensors to sense traffic.

Color vision deficiency or often called color blindness affects about 350 million people worldwide, 8% of all men (1 in 12) and 0.5% of women (one in 200). This condition is a Mendelian disorder with varying severity. Red-green color blindness is the commonest genetic type. Moreover, color vision naturally deteriorates with age, and may be an acquired condition secondary to damage to the eyes, nervous system or the brain. There are 3 types of color blindness: Anomalous trichromatism, monochromatism, and dichromatism. Traffic lights colors are difficult to distinguish by color impaired drivers who have difficulty, for example, distinguishing red from green. Therefore, existing traffic control technology relies on the location of the light within the entire structure (e.g., red on top or left). Even with such, it is often difficult for color-impaired individuals to see the entire traffic light structure at night, especially from a distance, leading to difficulty discerning a red traffic light from a green traffic light, as the only way for certain color-impaired drivers to tell red from green is by the location within the traffic light structure which is difficult at night when the entire structure of the traffic light is not visible. Some color impaired individuals (achromatopsia or rod monochromacy) only see black, white and shades of grey.

What is needed is a light display design that overcomes the shortcomings of existing traffic control signals.

SUMMARY OF THE INVENTION

The traffic control system and method provide a traffic control signal that has several advantages such as improved differentiation during sunrise and sunset, improved differentiation by those who have trouble differentiate between colors (e.g., color blindness), improved location for sensors (e.g., cameras, infrared detectors, ultrasonic detectors, radar); while maintaining the familiar color association of red for stop, yellow for caution, and green for go.

The traffic control signal has a single light emitting area having a central location in which sensors are optionally positioned in a central area. The traffic control signal is angled downward towards the vehicles for improved visibility and aiming of the sensors. There is a single light emitting area that is illuminated with red, yellow, or green light to signal to the vehicle drivers when they can safely move through the intersection or when they should stop. The light emitting area includes the ability to present motion, especially during display of green, through various intensities or color patterns and/or using a sweep hand as in a watch to convey the length of time that the yellow color is displayed. In this way, a person who has difficulty discerning the difference between red, yellow, and/or green is able to see the stationary color of red, the sweeping hand of yellow, and the constant movement of green. Regarding visibility of moving objects, it has been demonstrated that it is easier for the brain to detect motion, since motion in the environment directly maps to motion on the retina of the eye, even if the brain is in motion itself (see: "How the Brain Interprets Motion While in Motion" Lindsey Valich; University of Rochester; Jun. 13, 2022).

Having a downward slant not only provides better visibility to drivers of vehicles that are within range of the traffic control signal, but also shields the light emitting area from weather-related issues such as snow accumulation, ice, and dirt.

In one embodiment, a system for traffic control is disclosed including a light emitting area configured to emit red light, green light, and yellow light and a processor having a memory that is tangible. The light emitting area is operatively interfaced to the processor such that the processor is configured to control which color is emitted by the light emitting area. Software stored in the memory runs on the processor and is configured to control the light emitting area in three states, a stop state, a proceed state, and a caution state such that in the stop state, the processor controls the light emitting area to emit a red color; and in the proceed state, the processor controls the light emitting area to emit a green color with a moving dark area within the light emitting area to present the proceed state to a driver that has impaired color vision; and in the caution state, the processor controls the light emitting area to emit a yellow color with a dark sweep hand displayed at an angle that indicates an amount of time remaining for the caution state.

In another embodiment, a method of traffic control is disclosed including continuously changing between a stop state to a proceed state then to a caution state whereas in the stop state, a red color is displayed on a light emitting area of a traffic control signal; in the proceed state, a green color with a moving dark area is displayed within the light emitting area, thereby presenting the proceed state to a driver that has impaired color vision; and in the caution state, a yellow color with a dark sweep hand is displayed within the light emitting area such that the dark sweep hand is displayed at an angle that indicates an amount of time remaining for the caution state within the light emitting area.

In another embodiment, a system for traffic control is disclosed including a light emitting area comprising light emitting diodes. Each light emitting diode is configured to emit light of colors comprising red, green, and yellow. A processor that has a memory controls each light emitting diodes to selectively emit light by the plurality of light of the colors red, green, and yellow. Software stored in the memory runs on the processor and is configured to control the plurality of light emitting diodes in three states, a stop state, a proceed state, and a caution state. In the stop state, the processor controls the plurality of light emitting diodes to emit a red color. In the proceed state, the processor controls the plurality of light emitting diodes to emit a green color with a moving dark area within the light emitting area formed by not powering some of the light emitting diodes. The moving dark area is for interpretation of the proceed state by a driver that has impaired color vision. In the caution state, the processor controls the plurality of light emitting diodes to emit a yellow color with a dark sweep hand displayed at an angle that indicates an amount of time remaining for the caution state, again formed by not powering some of the light emitting diodes. The dark sweep hand for interpretation of the proceed state by the driver that has impaired color vision.

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
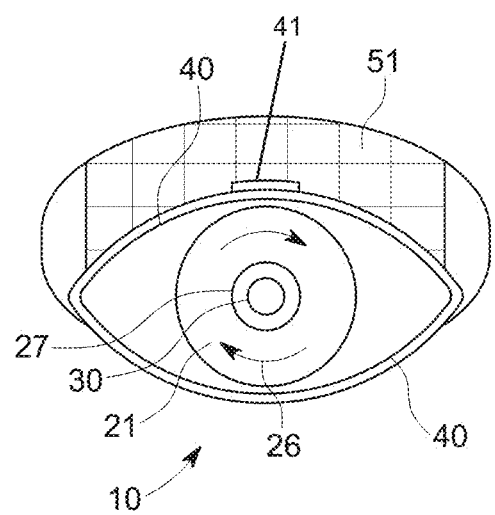
FIG. 1 illustrates a front view of a traffic control signal of the present invention.

Reference will now be made in detail to the presently preferred embodiments of the invention, examples of which are illustrated in the accompanying drawings. Throughout the following detailed description, the same reference numerals refer to the same elements in all figures.

Throughout this disclosure, colors are noted as red, yellow, and green. It needs to be understood that such colors are not absolute, nor are they intended to be pure. For example, there are many shades of green and it is also anticipated that, as color is often emitted by emitters that combine other colors to produce the desired color, the actual color that is emitted may not be green, but some combination of primary colors or any colors that will appear to be green to a human that is capable of discerning color.

Referring to FIG. 1, the traffic control signal 10 has a light emitting area 21. In some embodiments, the traffic control signal 10 is formed to resemble the human eye while in other embodiments, the traffic control signal 10 is round, square, hexagonal, oval, etc. The light emitting area 21 is illuminated by light sources such as light emitting diodes (e.g. super bright LEDs). A sensor area 27 of the traffic control signal 10 optionally includes one or more sensors 30, typically used for detecting vehicles and actions of the vehicles. In embodiments in which the traffic control signal 10 is formed to resemble the human eye, the sensor area 27 is formed in the shape of a human iris at the center of the light emitting area 21 and the sensor area 27 provides a location for a bank of zero or more sensors 30. These sensors include, but are not limited to, any of radar, laser, cameras, ultrasonic and Doppler system. In some embodiments, the sensor area 27 resembles a central "black hole" representing the pupil of an eye. In some embodiments, the sensors 30 are located outside of the light emitting area 21 (e.g., adjacent to the light emitting area 21) or the sensors 30 are embedded within the light emitting area 21, integrated with the light sources.

Figure 5:
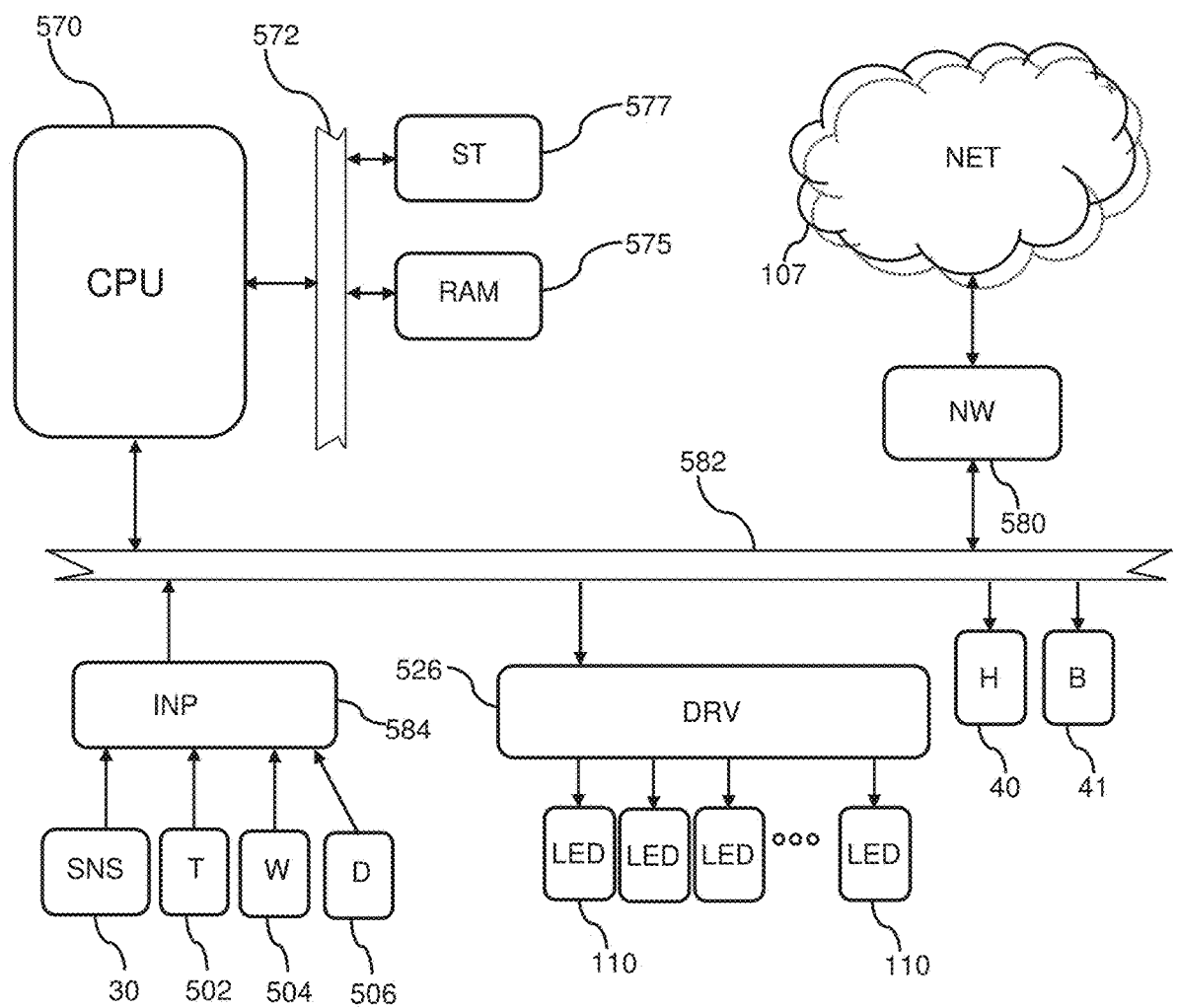
FIG. 5 illustrates a schematic view of an exemplary implementation of the traffic control signal of the present invention.

In some embodiments, the sensors 30 track objects that are forward of the traffic control signal 10 (e.g., vehicles and pedestrians), monitoring direction, and instantaneous velocity and when the direction and/or instantaneous velocity of any given object changes significantly (significantly beyond what is normally expected during normal traffic/pedestrian movement), the traffic control signal 10 determines that an impact or collision has occurred and reports the impact, along with a calculated severity of the impact to a central authority through the data network 107 (see FIG. 5).

Figure 2A:
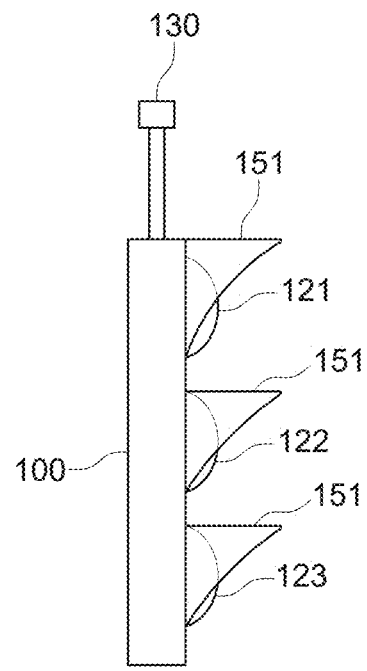
FIG. 2A illustrates a side view of a traffic light of the prior art.
Figure 2B:
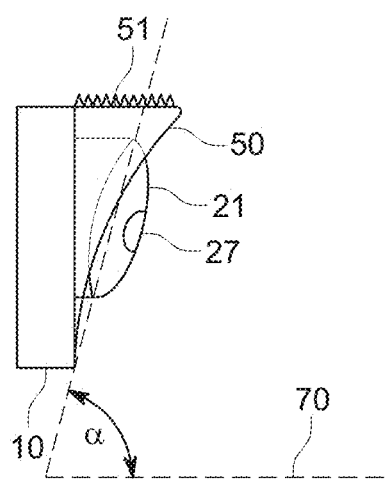
FIG. 2B illustrates a side view of a traffic control signal of the present invention.

As shown in FIG. 2B, the traffic control signal 10 is angulated at less than 90° from the road surface, thereby aiming towards the traffic that is being controlled.

Figure 4A:
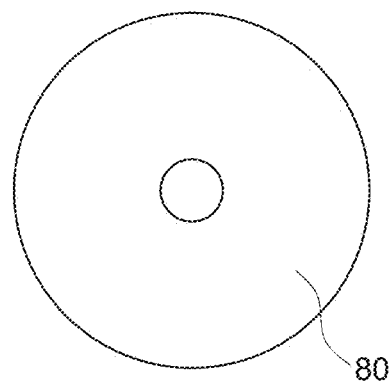
FIGS. 4A-4C illustrate illumination patterns of the traffic control signal of the present invention.
Figure 4B:
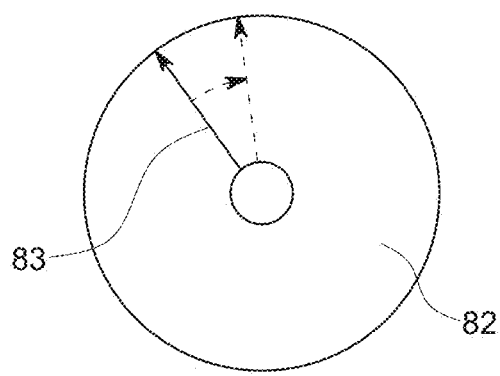
Figure 4C:
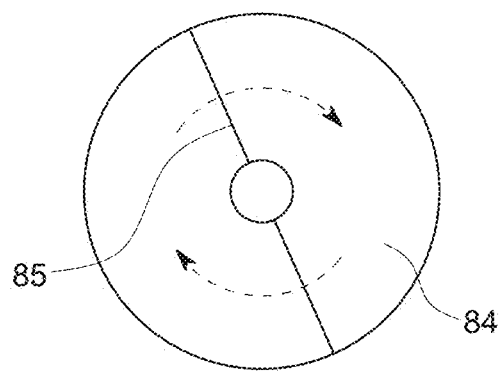

Light sources such as light emitting diodes emit color depending upon the state of the traffic control signal 10. The light sources emit red for stopping, yellow to signal caution and green to signal proceed. The human brain, a computer or an artificial intelligence entity (e.g., within a smart car) identifies the green color as proceed, the yellow color as either proceed with caution or prepare to stop, and the red color as stop. As shown in FIGS. 4A, 4B, and 4C, the green color 84 is emitted with an object 85 (e.g. a bar or arrow of black or a darker green color) that rapidly rotates (see rotation arrows 26) around a center of the light emitting area 21 (e.g., in some embodiment, the central non-illuminating area 27) to emphasize motion and signal to proceed. The yellow color 82 is emitted and includes an object (e.g., a sweep hand 83) that rotates from a position indicating the number of seconds remaining (e.g., the number of seconds until the red color 80 is displayed) to help a driver judge when vehicle could safely clear the intersection or when the vehicle should prepare to stop as the vehicle will not be able to safely clear the intersection before the traffic control signal 10 changes to emit the red color 80. The sweep hand 83 indicates the duration of the caution signal for that intersection while the light sources emit a color of yellow. The light sources stop emitting the yellow light when the sweep hand approaches the top (e.g., 12 PM), at which time the sweep hand 83 disappears and the light sources emit the color red 80 to indicate stop. For example, when the traffic control signal 10 has a caution duration of six seconds, the light emitting area emits yellow and the sweep hand 83 starts at the 54 second position (clock coordinates) and sweeps upwardly, one second at a time, until the caution duration expires. In another example, when the traffic control signal 10 has a caution duration of three seconds, the sweep hand 83 starts at the 57 second position (clock coordinates) and sweeps upwardly, one second at a time, until the caution duration expires.

In some embodiments, the traffic control signal 10 emits a pulsed color as an indication of a certain status (on/off at a fixed interval, e.g., blinking), for example, pulsed emission of a red color indicates stop then proceed with caution (e.g., used during power failures). Pulsed yellow is also anticipated along with the slow-moving sweep hand 83. Pulsed yellow turn arrows and pulsed red turn arrows are also anticipated.

Color impaired individuals (achromatopsia or rod monochromacy) are then able to differentiate the signals by the movements of the object 85 (e.g., bar 85) and the sweep hand 83 or lack thereof.

Figure 3A:
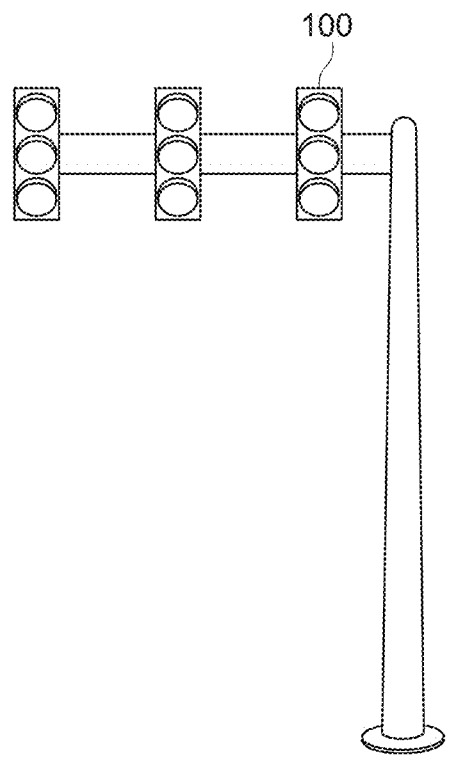
FIG. 3A illustrates a front elevation view of the traffic light of the prior art.

The prior-art traffic light 100 as shown in FIGS. 2A and 3A has a red bezel 121, yellow bezel 122, and green bezel 123 to signal stop, caution, and proceed. Each bezel 121/122/123 has a shroud 151 for shade and to reduce accumulation of dirt and weather-related material such as snow and ice. As shown in FIG. 2A, the prior-art traffic light 100 is typically positioned at a 90-degree angle to the roadway which impacts visibility negatively during certain hours of the day (e.g., sunrise and sunset) and enables certain materials to accumulate on the bezels 121/122/123 (e.g., dirt and snow). As the prior-art traffic light 100 has solid bezels 121/122/123 with a monolithic light source (e.g., incandescent lamp or LED lamp), there is no ability for the portrayal of motion in each. Therefore, to account for those who have difficulty discerning color, the position of each bezel 121/122/123 is used (e.g., the red bezel 121 is at the top or left, the yellow bezel 122 is at the middle and the green bezel 123 is at the bottom or right). This requires those who have difficulty discerning color to recognize the position of each bezel 121/122/123 to know the status of the prior-art traffic light 100.

As for sensing traffic, the prior-art traffic light 100 often has one or more sensors 130 mounted somewhere above or below the set of bezels 121/122/123. This creates a paradox as the prior-art traffic lights 100, being at a 90-degree angle to the roadway, aim towards the horizon rather than towards the roadway while the sensors 130 need to monitor vehicles that are within a close distance to the prior-art traffic light 100.

Figure 3B:
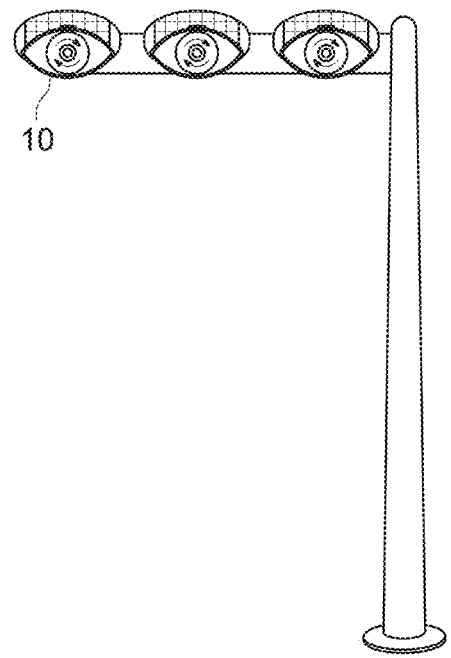
FIG. 3B illustrates a front elevation view of the traffic control signal of the present invention.

It should be noted that the prior-art traffic light 100 requires three, distinct, bezels 121/122/123, each requiring the ability to replace emitting devices and, hence, requiring seals to prevent moisture penetration, each requiring periodic cleaning, each requiring an enclosure and shrouds 151, contributing to weight, costs, and increased wind resistance that often causes failures during high winds. Further, the probability of failure is increased by having three distinct light emitting elements. This is further shown in FIGS. 3A and 3B. For a given road width (e.g., a three-lane road), FIG. 3A shows a typical prior-art traffic light configuration (one prior-art traffic light 100 for each lane) requiring a total of nine light emitters and substantial extra weight and cost. FIG. 3B shows an embodiment having three traffic control signals 10, one for each lane, requiring three light emitters (six less than the prior art), lower weight, lower cost, more energy efficient, etc. Furthermore, having less weight allows for the same or lower structural support (e.g., poles, arms, and footings).

As a comparison, consider the prior-art traffic light 100 having three, distinct bezels 121/122/123, each having a diameter of 12 inches (12") compared to the traffic control signal 10 having a light emitting area 21 with a diameter of 20 inches (20") with a diameter of the sensor area 27 being two inches (2"). The total area of the light emitting area 21 is 314 square inches (10" radius squared is 100, times Pi=314 square inches) minus the area of the sensor area 27 which is 3 square inches (1" radius squared is 1, times Pi=3 square inches). The total light emitting area of the traffic control signal 10 is therefore 311 square inches (314 sq in-3 sq in). In contrast, as only one bezel 121/122/123 of the prior-art traffic light 100 is illuminated at any one time, the total area of each 12" bezel is only 113 square inches (6" radius squared is 36, times Pi=113 square inches). Therefore, at any given state of the traffic control signal 10, 311 square inches of color light is emitted versus, in the same state, only 113 square inches of light for the prior-art traffic light 100, while the total area of the three bezels 121/122/123 of the prior-art traffic light 100 add up to a slightly larger total area (3*113=339 sq in vs. 311 sq.in). This means that the prior-art traffic light 100, for a given brightness and assuming similar light emitting technology, requires approximately the same area of light emitting coverage while only presenting ⅓ of the total light emitting area at any one state.

Instead of relying upon only color to signal drivers when to stop, use caution, or to proceed, the traffic control signal 10 utilizes color and motion. Regarding visibility of moving objects, it has been demonstrated that there is a type of neuron in the brain that has a particular combination of response properties, making it well-suited to distinguish between visual reception of motion caused by the person moving and the motion of other objects. (see: "Casual Inference" Lindsey Valich; University of Rochester; Jun. 13, 2022). Therefore, a human in a vehicle that is in motion (or stopped), is able to discern motion of objects within the scenery even though the scenery around such person is in relative motion to the person. The traffic control signal 10 utilizes this ability to decern motion to augment color and provide signaling that is easier to see for motorists that have difficulty discerning color or any motorist during adverse conditions such as strong ambient light as is often the case during sunrise and sunset, precipitation, fog, smog, etc.

Motion is provided to instill differences between each signal state (e.g., stop, caution, proceed). For example, as shown in FIGS. 4A, 4B, and 4C, the stop signal state is presented in FIG. 4A as the light emitting area 21 being illuminated in solid red 80 with no simulated motion. In FIG. 4B, the light emitting area 21 is illuminated in yellow 82 with motion simulated by a sweep hand that appears black (absent of color) simulated by sequentially turning off a set of light emitters in a pattern that represents an arrow 83 that will sweep around the light emitting area 21 until the arrow 83 points upward (e.g., at 12:00 in 12 hour format). In this way, a human or autonomous vehicle approaching the traffic control signal 10 will see/detect the color yellow 82 as well as the motion of the sweep hand (arrow 83 or other object) that will provide indication of how long before the traffic control signal 10 will signal stop. In FIG. 4C, the light emitting area 21 is illuminated in green 84 with motion simulated by a bar 85 that appears black (absent of color) simulated by sequentially turning off a set of light emitters in a pattern that represents the bar 85 that will rotate around the light emitting area 21. In this way, a human approaching the traffic control signal 10 will see the color green 84 as well as the motion of the bar 85 (or other object) and interpret the state of the traffic control signal 10 as "proceed." In some embodiments, the rate of motion (e.g., the speed at which the bar 85 appears to rotate) is proportionate to the remaining time before the traffic control signal 10 will change state (e.g., change to proceed with caution). As such, the motorist can gauge whether the traffic control signal 10 will change in a short time or a long time depending upon the rotation speed of the bar 85. It should be noted that, although actual moving indicators are fully anticipated, for many reasons, the motion is simulated by controlling individual light emitters or other light control mechanism (e.g., liquid crystals) similar to how a television, monitor, or billboard presents images that appear to have motion.

In some embodiments, the traffic control signal 10 is for turns. In such, it is anticipated that the light emitting area 21 or the light that is emitted be shaped to indicate a turn signal, for example, an arrow. For example, only the light emitting diodes 110 that form an arrow are illuminated in the color (red, green, yellow) in the shape of an arrow pointing to the direction in which the driver is allowed to go or stop. In such, the green turn arrow (state=proceed) includes a dark object (e.g., black) that moves rapidly to indicate proceed (in the direction of the arrow) to assist those who have color impairments. The yellow turn arrow (state=caution) includes a dark object (e.g., black) that moves slowly (e.g., moves once every second) to indicate caution, the dark object assisting those who have color impairments, and the red turn arrow (state=stop) has no moving components allowing those who have color impairments to recognize the stop state as lacking any moving component.

As shown in FIG. 2B, the light emitting area 21 and, when present, the central non-illuminating area 27 for the optional sensors 30 are tilted at an angle, a, of less than 90° from the road surface (e.g., 70-85 degrees). This angle, a, reduces reflection by the sun at sunrise and sunset. Additionally, any optional sensors 30 are also tilted at the same angle, a, towards the road surface for better visualization and detection of vehicles and pedestrians within range of the traffic control signal 10.

Heating elements 40 provide protection against extremely cold temperatures, ice and snow. Air blowers 41 are used to prevent the accumulation of debris, snow, ice, dust, sand and dirt on the iris 21 and sensor 30. The entire design is covered by an eyelid like visor or hood 50 for protection of the iris and sensors. The visor is in turn covered by solar panels 51 to generate green electricity. The entire system resembles the "Swiss knife" concept where currently available items are combined in one structure for improved performance.

In contrast, FIG. 2A shows a prior-art traffic light 100 which has three light emitting bezels, a red bezel 121, a yellow bezel 122, and a green bezel 123. Generally, the prior-art traffic light 100 is typically mounted perpendicular to the road surface, and there are three visors, one shielding each of the red bezel 121, the yellow bezel 122, and the green bezel 123. As more modern prior-art traffic light 100 incorporate light emitting diodes (LEDs), the total light-emitting area and often the total number of LED's required by prior-art traffic light 100 is greater than the traffic control signal 10 as separate light emitting devices are required to illuminate each of the red bezel 121, yellow bezel 122, and green bezel 123. As the modern prior-art traffic light 100 requires a housing for each bezel 121/122/123, the total weight of the modern prior-art traffic light 100 is greater than the traffic control signal 10 and, the modern prior-art traffic light 100 is larger than the traffic control signal 10, leading to increased wind resistance that often causes failure during storms. In addition, any sensors 130 are mounted outside the modern prior-art traffic light 100. It is often difficult for color-impaired individuals to see the entire modern prior-art traffic light 100 at night especially from a distance and therefore such individuals are unable to tell when the red bezel 121 or the green bezel 123 is illuminated. The only way a color-impaired person differentiates red from green using modern prior-art traffic light 100 is by the location within the traffic light structure. The top bezel is the red bezel 121 and the bottom bezel is the green bezel 123, or if the modern prior-art traffic light 100 is mounted horizontally, the left bezel is the red bezel 121 and the right bezel is the green bezel 123. This requires that color impaired individuals see the entire structure to differentiate stop from go.

FIG. 2B shows a side view of the traffic control signal 10 mounted so that the light emitting area 21 is slanted less than 90° from the road surface. This angle provides for improved visibility by drivers that are approaching the traffic control signal 10 and accurate directionality of sensors 30 as the sensors 30 are aimed at the roadway in front of the traffic control signal 10 rather than towards the horizon.

Referring to FIG. 3A, three modern prior-art traffic lights 100 are shown. Note that multiple modern prior-art traffic light 100 are often positioned side-by-side to improve visibility for multiple-lane roads.

Referring to FIG. 3B, three traffic control signal 10 are shown. Note that it is anticipated that multiple traffic control signal 10 be positioned side-by-side to improve visibility for multiple-lane roads.

FIGS. 4A, 4B, and 4C show the phases of operation of the traffic control signal 10. FIG. 4A shows the stop phase in which the light emitting area 21 emits a constant red color 80.

FIG. 4B shows the caution phase in which the light emitting area 21 emits a yellow color 82 with an object or sweep hand 83 that provides an indication to drivers of an amount of time before the caution phase ends and the traffic control signal 10 changes to the stop phase. The sweep hand 83 (or any object) is displayed in the light emitting area 21 as a dark object (e.g., black or absent of color). In such, when the caution phase begins, the sweep hand 83 is displayed at a position indicating the number of seconds until the caution phase ends. For example, dividing the light emitting area 21 into 60 equal angles as in a clock, numbers 1 second to 60 seconds with 60 seconds being at the top, if the duration of the caution phase is six seconds, when the caution phase starts, the sweep hand 83 is displayed at the 54 minute angle (60-54) and each second, the sweep hand 83 is displayed closer to the 60 seconds mark until the caution phase ends and the red phase begins as described above. In another example, if the duration of the caution phase is four seconds, when the caution phase starts, the sweep hand 83 is displayed at the 56-minute angle (60-4) and each second, the sweep hand 83 is displayed closer to the 60 seconds mark until the caution phase ends and the stop phase begins as described above.

FIG. 4C shows the proceed phase in which the light emitting area 21 emits a green color 84 with the object 85 (e.g. a bar or arrow of black or a darker green color) that rapidly rotates (see rotation arrows 26) continuously around or within the light emitting area 21 during the proceed phase. The movement of the object 85 provides an indication to proceed to those who are color impaired.

Referring to FIG. 5, a schematic diagram of the traffic control signal 10 is shown. It should be noted that although a processor-based design is shown as an example, it is well known to implement similar designs in non-processor circuits using discrete logic, etc. In this embodiment, a processor or microcontroller controls operation of the traffic control signal 10 and is referred to as a CPU 570. Interfaced to the CPU 570 is data storage 577 for storing programs, etc., and random-access memory 575. In some embodiments, the data storage and random-access memory 575 are interfaced to the CPU by a memory bus 572 or any way known in the industry (e.g., internal storage). In some embodiments, there is a system bus 582 for connecting to input/output subsystems, though it is fully anticipated that the CPU 570 is a microcontroller having internal input/output circuitry. In some embodiments, the sensors 30 are interfaced to an input port 584 that is either internal to the CPU 570 or interfaced to the system bus 582.

The processor or CPU 570 is interfaced to a set of light emitting diodes 110 through a driver 526, allowing the CPU 570 to individually control each light emitting diodes 110 (e.g., a matrix of LEDs, each capable of emitting at least red, green, and yellow light) or to control sets of light emitting diodes 110 (e.g., sets of red light emitting diodes 110, sets of green light emitting diodes 110, and sets of yellow light emitting diodes 110).

In some embodiments, a wired or wireless interface 580 is provided for communication wirelessly through a data network 107 to report traffic conditions, status, impacts to pedestrians and/or vehicles, and to synchronize with other traffic control system.

In some embodiments, heating elements 40 are operatively coupled to the CPU 570 to selectively provide protection against extremely cold temperatures, ice and snow. Likewise, air blowers 41 are operatively coupled to the CPU 570 to selectively provide forced air to reduce the accumulation of debris, rain, snow, ice, dust, sand and dirt on the iris 21 and sensor 30.

In some embodiments, there are local sensors 502/504/506 that include, for example, a temperature sensor 502 to sense temperature, a water sensor 504 to sense wetness on the surface of the traffic control signal 10, and a dirt/sand sensor 506 that senses dirt or sand accumulation on the light emitting area 21 and/or the sensor area 27. In such, the processor or CPU 570 monitors the local sensors 502/504/506 to determine when to initiate operation of the heater 40 and/or air blower 41 to reduce ice/snow/sleet/dirt accumulation on the light emitting area 21 and/or the sensor area 27 or any other part of the traffic control signal 10. For example, heating and blowing off moisture. In some embodiments, there is a water collection system to collect rainwater and, after filtering the rainwater, the rainwater is sprayed onto the light emitting area 21 and/or the sensor area 27 for cleaning purposes.

Figure 6:
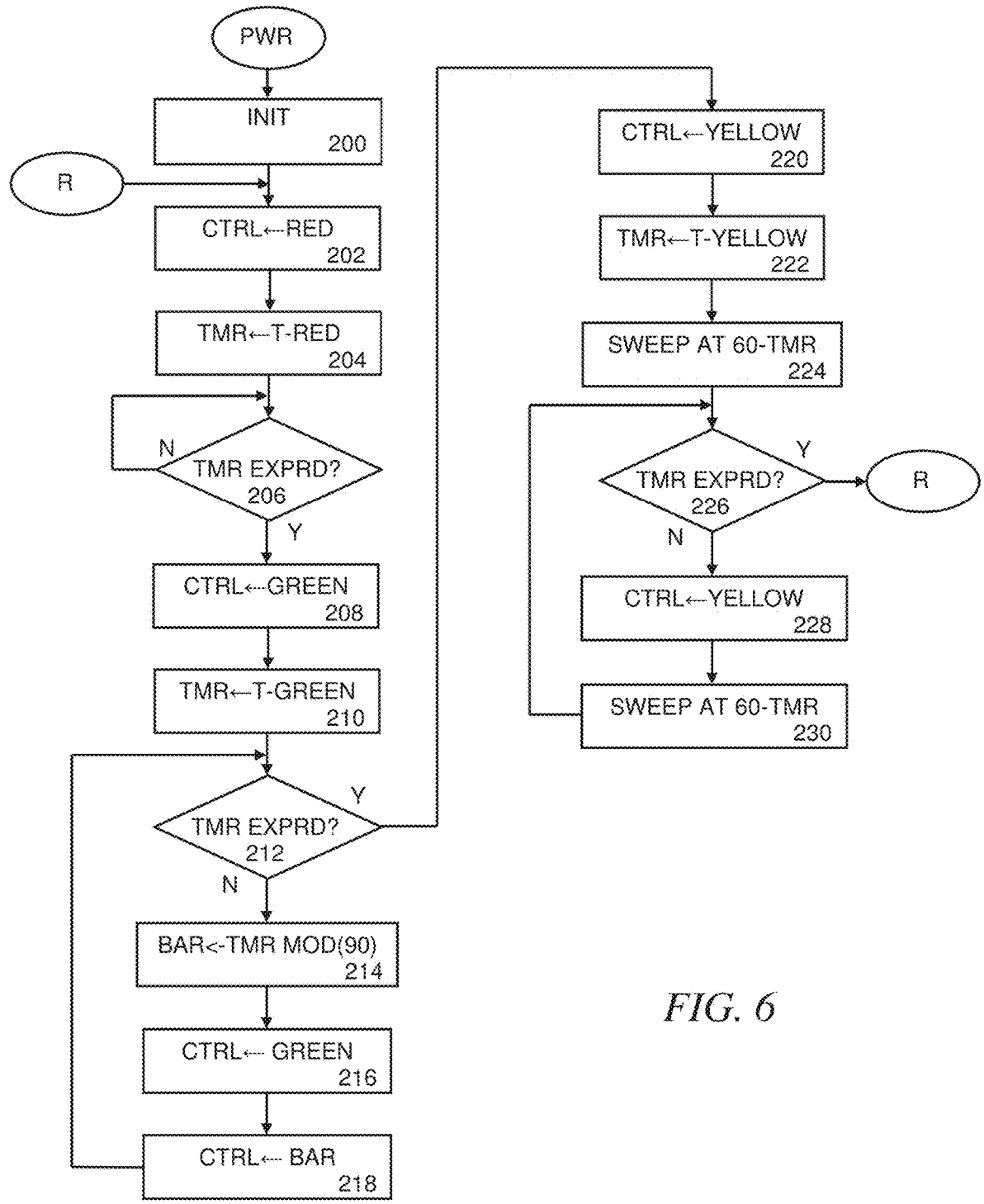
FIG. 6 illustrates an exemplary program flow of the traffic control signal of the present invention.

Referring to FIG. 6, an exemplary program flow of the traffic control signal of the present invention is shown. In this example, after power is provided, the traffic control signal 10 initialized 200, for example, determining which direction at an intersection will start as the state of "proceed" (e.g., green) and which direction will start as the state of stop (e.g., red). As an example, this traffic control signal 10 will start at the state of "stop" (e.g., red).

In the state of "stop," the light emitting area 21 is controlled to display red 202 and a timer is set to the duration of the state of "stop" 204 (e.g., T-RED). The light emitting area 21 continues to emit the color red until the timer expires 206.

When the timer expires 206, the state of the traffic control signal 10 is changed to "proceed" and the light emitting area 21 is controlled to display "proceed" 208 and a timer is set to the duration of the state of "proceed" 210 (e.g., T-GREEN). The light emitting area 21 continues to emit the color green until the timer expires 212 except that until the timer expires 212, each time through a loop 212-218, a location for displaying an object 85 (e.g., a dark or black bar) is calculated 214 (e.g., determine an angle of the bar as a modulus-90 of the timer, so if the timer is at 180 seconds, the object 85 (or bar) is at zero degrees and if the timer is at 110 seconds, the object 85 (or bar) is at 20 degrees, etc. Now the light emitting area 21 is controlled to display green 216 and the object 85 (e.g., bar) is displayed 218 at the calculated angle.

When the timer expires 212, the state of the traffic control signal 10 is changed to "caution" and the light emitting area 21 is controlled to display yellow 220 and a timer is set to the duration of the state of "caution" 222 (e.g., T-YELLOW). A sweep hand 83 is displayed 224 (e.g. a black arrow) at a clock coordinate that is 60 minus the duration of the state of "caution" (in seconds). Therefore, as an example, when the duration of the state of "caution" is six seconds, the sweep hand 83 is displayed at (60-6) or 54 seconds. Until the timer expires 226, each time through a loop 226-230, the light emitting area 21 is controlled to display yellow 228 and sweep hand 83 is displayed (e.g. a black arrow) at a clock coordinate that is 60 minus the remaining time in seconds 230.

When the timer expires 226, the above is repeated at 202 to change the status of the traffic control signal 10 to "stop."

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A system for traffic control, the system comprising:
    a light emitting area configured to emit light of red light, green light, and yellow light;
    a processor having a memory that is tangible, the light emitting area operatively interfaced to the processor such that the processor is configured to control which color is emitted by the light emitting area;
    software stored in the memory runs on the processor, the software configured to control the light emitting area in three states, a stop state, a proceed state, and a caution state;
    whereas in the stop state, the processor controls the light emitting area to emit a red color;
    whereas in the proceed state, the processor controls the light emitting area to emit a green color with a moving dark area that is formed by not powering some light emitting diodes within the light emitting area, creating a bar that rapidly rotates within the light emitting area to present the proceed state to a driver that has impaired color vision; and
    whereas in the caution state, the processor controls the light emitting area to emit a yellow color with a dark sweep hand displayed at an angle that indicates an amount of time remaining for the caution state.

2. The system of claim 1, whereas the light emitting area comprises a plurality of light emitting diodes, each light emitting diode configured to emit red light, green light, yellow light or no light when off.

3. The system of claim 1, whereas the light emitting area comprises a plurality of red light emitting diodes, a plurality of green light emitting diodes, and a plurality of yellow light emitting diodes.

4. The system of claim 1, whereas the light emitting area is planar and set at a non-perpendicular angle to a roadway that is controlled by the system for the traffic control.

5. The system of claim 4, further comprising a sensor area within the light emitting area for supporting one or more sensors that are aimed at the roadway.

6. The system of claim 1, further comprising a heater operatively interfaced to the processor and controlled by the processor, a blower operatively interfaced to the processor and controlled by the processor, a temperature sensor operatively interfaced to the processor, and a moisture sensor operatively interfaced to the processor such that the software reads the temperature sensor and the moisture sensor and when a temperature is below freezing and moisture is present, the software initiates the heater and blower to keep the light emitting area free of snow and ice.

7. A method of traffic control, the method comprising:
continuously changing between a stop state to a proceed state then to a caution state;
in the stop state, displaying a red color on a light emitting area of a traffic control signal;
in the proceed state, displaying a color green with a moving dark area that is formed by not powering some light emitting diodes within the light emitting area, creating a bar that rapidly rotates within the light emitting area, thereby presenting the proceed state to a driver that has impaired color vision; and
in the caution state, displaying a color yellow with a dark sweep hand that is displayed at an angle that indicates an amount of time remaining for the caution state within the light emitting area.

8. The method of claim 7, whereas the light emitting area comprises a plurality of light emitting diodes, each light emitting diode configured to emit red light, green light, yellow light or no light when off.

9. The method of claim 7, whereas the light emitting area comprises a plurality of red light emitting diodes, a plurality of green light emitting diodes, and a plurality of yellow light emitting diodes.

10. The method of claim 7, whereas the light emitting area is planar and setting the light emitting area at a non-perpendicular angle to a roadway that is being controlled.

11. The method of claim 10, further comprising sensing a temperature and moisture and when the temperature is below freezing and moisture is present, powering a heater to generate heat and powering blower to keep the light emitting area free of snow and ice.

12. A system for traffic control, the system comprising:
a light emitting area comprising a plurality of light emitting diodes, each light emitting diode of the plurality of light emitting diodes is configured to emit light of colors comprising red, green, and yellow;
a processor having a memory that is tangible, each light emitting diodes of the plurality of light emitting diodes is operatively interfaced to the processor such that the processor is configured to control the colors emitted by the plurality of light emitting diodes;
software stored in the memory runs on the processor, the software configured to control the plurality of light emitting diodes in three states, a stop state, a proceed state, and a caution state;
whereas in the stop state, the processor controls the plurality of light emitting diodes to emit a red color;
whereas in the proceed state, the processor controls the plurality of light emitting diodes to emit a green color with a moving dark area that is formed by not powering some light emitting diodes within the light emitting area, creating a bar that rapidly rotates within the light emitting area, the moving dark area for interpretation of the proceed state by a driver that has impaired color vision; and
whereas in the caution state, the processor controls the plurality of light emitting diodes to emit a yellow color with a dark sweep hand displayed at an angle that indicates an amount of time remaining for the caution state, the dark sweep hand for interpretation of the proceed state by the driver that has impaired color vision.

13. The system of claim 12, whereas the processor displays the moving dark area by blanking one or more light emitting diodes of the plurality of light emitting diodes so that the one or more light emitting diodes of the plurality of light emitting diodes do not emit light.

14. The system of claim 12, whereas the light emitting area is planar and the light emitting area is set at a non-perpendicular angle to a roadway that is controlled by the system for traffic control.

15. The system of claim 14, further comprising a sensor area within the light emitting area for supporting one or more sensors that are aimed at the roadway.

16. The system of claim 15, wherein the one or more sensors comprise one or more sensors selected from a group consisting of a radar sensor, an ultrasonic sensor, a camera sensor a laser sensor, and a Doppler sensor.

17. The system of claim 12, further comprising a heater operatively interfaced to the processor and controlled by the processor, a blower operatively interfaced to the processor and controlled by the processor, a temperature sensor operatively interfaced to the processor, and a moisture sensor operatively interfaced to the processor such that the software reads the temperature sensor and the moisture sensor and when a temperature is below freezing and moisture is present, the software initiates the heater and blower to keep the light emitting area free of snow and ice.

18. The system of claim 12, further comprising a solar panel positioned on an enclosure of the system for traffic control.

19. The system of claim 12, wherein the light emitting area is substantially round.

20. The system of claim 12, further comprising a dust/dirt sensor operatively interfaced to the processor and a blower operatively interfaced to the processor, the software configured to periodically read the dust/dirt sensor and responsive to an indication of a presence of dirt/dust, the software configured to control operate blower to remove some of the dirt/dust.

* * * * *